US011978580B2

(12) United States Patent
Tobita et al.

(10) Patent No.: US 11,978,580 B2
(45) Date of Patent: May 7, 2024

(54) MULTILAYER COIL COMPONENT

(71) Applicant: TDK CORPORATION, Tokyo (JP)

(72) Inventors: Kazuya Tobita, Tokyo (JP); Yuto Shiga, Tokyo (JP); Youichi Kazuta, Tokyo (JP); Noriaki Hamachi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 889 days.

(21) Appl. No.: 16/696,274

(22) Filed: Nov. 26, 2019

(65) Prior Publication Data

US 2020/0176173 A1 Jun. 4, 2020

(30) Foreign Application Priority Data

Nov. 30, 2018 (JP) ................................ 2018-225351

(51) Int. Cl.

*H01F 27/29* (2006.01)
*H01F 27/28* (2006.01)
*H01F 27/34* (2006.01)
*H01F 27/32* (2006.01)

(52) U.S. Cl.

CPC ....... *H01F 27/2852* (2013.01); *H01F 27/292* (2013.01); *H01F 27/34* (2013.01); *H01F 27/323* (2013.01)

(58) Field of Classification Search

CPC .... H01F 27/2852; H01F 27/292; H01F 27/34; H01F 27/323

See application file for complete search history.

(56) References Cited

U.S. PATENT DOCUMENTS 6,114,936 A * 9/2000 Yamamoto ............ H01F 27/292 336/200
6,304,164 B1 * 10/2001 Ohno .................. H01F 17/0006 336/200
7,928,823 B2 * 4/2011 Tatsukawa .......... H01F 41/0233 336/200
10,176,916 B2 * 1/2019 Seko ................... H01F 17/0013
2005/0122699 A1 * 6/2005 Maeda ................ H01F 17/0013 174/262
2009/0278649 A1 * 11/2009 Tatsukawa .......... H01F 41/0233 336/200
2010/0253464 A1 * 10/2010 Miyoshi .............. H01F 17/0013 336/200

(Continued)

FOREIGN PATENT DOCUMENTS

CN 105742041 A 7/2016
CN 108735424 A 11/2018

(Continued)

*Primary Examiner* — Mang Tin Bik Lian
(74) *Attorney, Agent, or Firm* — Oliff PLC

(57) ABSTRACT

A first dimension of each of a first connection portion 12 and a second connection portion 14 in the direction in which a pair of side surfaces 2*e* and 2*f* face each other is smaller than an inner diameter W2 of a coil 8 in the direction and is larger than a width W1 of each of a plurality of coil conductors in the direction. A second dimension of each of the first connection portion 12 and the second connection portion 14 in the direction in which a pair of main surfaces 2*c* and 2*d* face each other is larger than a thickness H1 of each of the plurality of coil conductors in the direction and is smaller than a height H2 of the coil 8 in the direction.

3 Claims, 5 Drawing Sheets

(56) References Cited

U.S. PATENT DOCUMENTS

| | | | | |
|---|---|---|---|---|
| 2013/0187744 | A1* | 7/2013 | Seko | H01F 17/0013 336/200 |
| 2015/0287514 | A1* | 10/2015 | Lim | H01F 17/0033 336/200 |
| 2016/0189850 | A1* | 6/2016 | Lee | H01F 27/292 336/200 |
| 2018/0218829 | A1* | 8/2018 | Endo | H01F 17/0013 |
| 2018/0308617 | A1 | 10/2018 | Ha et al. | |
| 2019/0074131 | A1* | 3/2019 | Yamanaka | H01F 27/2804 |
| 2019/0295763 | A1* | 9/2019 | Cho | H01F 41/041 |
| 2019/0311844 | A1* | 10/2019 | Park | H01F 27/32 |

FOREIGN PATENT DOCUMENTS

| | | | |
|---|---|---|---|
| JP | H05-013238 | A | 1/1993 |
| JP | 2009-295819 | A | 12/2009 |
| JP | 2010-245134 | A | 10/2010 |

* cited by examiner

MULTILAYER COIL COMPONENT

TECHNICAL FIELD

An aspect of the present invention relates to a multilayer coil component.

BACKGROUND

The multilayer coil component that is described in Patent Document 1 (Japanese Unexamined Patent Publication No. 2009-295819) is known as an example of multilayer coil components according to the related art. The multilayer coil component described in Patent Document 1 includes an element body formed by a plurality of dielectric layers being stacked and having a pair of end surfaces facing each other, a pair of main surfaces facing each other, and a pair of side surfaces facing each other, a coil configured by a plurality of coil conductors being interconnected, disposed in the element body, and having a coil axis extending along the direction in which the pair of main surfaces face each other, a pair of external electrodes electrically connected to the coil and disposed on each surface of the element body, and a connection portion interconnecting the coil and each of the pair of external electrodes.

SUMMARY

In the multilayer coil component according to the related art, the connection portion is disposed from one side surface to the other side surface in the direction in which the pair of side surfaces face each other so that connectivity is ensured between the coil and the external electrodes. As a result, in the multilayer coil component according to the related art, the resistance value between the coil and the external electrode is reduced by a contact area being ensured between the connection portion and the external electrode. However, in this configuration, the area of facing between the coil and the connection portion is large, and thus the stray capacitance (parasitic capacitance) that is formed between the coil and the connection portion increases. Accordingly, characteristics can be deteriorated in the multilayer coil component according to the related art.

An object of an aspect of the present invention is to provide a multilayer coil component that can be improved in terms of characteristics.

A multilayer coil component according to an aspect of the present invention includes an element body formed by a plurality of dielectric layers being stacked and having a pair of end surfaces facing each other, a pair of main surfaces facing each other, and a pair of side surfaces facing each other, a coil configured by a plurality of coil conductors being interconnected, disposed in the element body, and having a coil axis extending along a facing direction of the pair of main surfaces, a first external electrode disposed on one of the end surfaces, the pair of main surfaces, and the pair of side surfaces of the element body and a second external electrode disposed on the other end surface, the pair of main surfaces, and the pair of side surfaces of the element body, and a first connection portion interconnecting one end portion of the coil and the first external electrode and a second connection portion interconnecting the other end portion of the coil and the second external electrode. A first dimension of each of the first connection portion and the second connection portion in a facing direction of the pair of side surfaces is smaller than an inner diameter of the coil in the facing direction of the pair of side surfaces and is larger than a width of each of the plurality of coil conductors in the facing direction of the pair of side surfaces. A second dimension of each of the first connection portion and the second connection portion in the facing direction of the pair of main surfaces is larger than a thickness of each of the plurality of coil conductors in the facing direction of the pair of main surfaces and is smaller than a height of the coil in the facing direction of the pair of main surfaces.

In the multilayer coil component according to an aspect of the present invention, the first dimension of each of the first connection portion and the second connection portion in the facing direction of the pair of side surfaces is smaller than the inner diameter of the coil in the facing direction of the pair of side surfaces and the second dimension of each of the first connection portion and the second connection portion in the facing direction of the pair of main surfaces is smaller than the height of the coil in the facing direction of the pair of main surfaces. As a result, in the multilayer coil component, the area of facing between the coil and each of the first connection portion and the second connection portion can be reduced. Accordingly, in the multilayer coil component, the stray capacitance that is generated between the coil and the first and second connection portions can be reduced. Accordingly, characteristics can be improved in the multilayer coil component.

In the multilayer coil component, the first dimension of each of the first connection portion and the second connection portion in the facing direction of the pair of side surfaces is larger than the width of each of the plurality of conductors in the facing direction of the pair of side surfaces and the second dimension of each of the first connection portion and the second connection portion in the facing direction of the pair of main surfaces is larger than the thickness of each of the plurality of conductors in the facing direction of the pair of main surfaces. As a result, in the multilayer coil component, the coil and each of the first connection portion and the second connection portion are reliably connected to each other, and thus connectivity can be ensured between the coil and each of the first external electrode and the second external electrode. Accordingly, the characteristics can be improved in the multilayer coil component.

In an embodiment, each of the first connection portion and the second connection portion may have a rectangular parallelepiped shape. In this configuration, the coil and each of the first connection portion and the second connection portion can be reliably connected to each other and connectivity can be further ensured between the coil and each of the first external electrode and the second external electrode.

In an embodiment, the first connection portion and the second connection portion may be disposed in a region between a surface of the coil on a side of one of the main surfaces and a surface of the coil on a side of the other main surface in the facing direction of the pair of main surfaces. In this configuration, the distance between each of the first connection portion and the second connection portion and each of the first external electrode and the second external electrode disposed on the pair of main surfaces can be increased. Accordingly, in the multilayer coil component, the stray capacitance that is generated between each of the first and second connection portions and each of the first and second external electrodes can be reduced. As a result, the characteristics can be further improved in the multilayer coil component.

According to an aspect of the present invention, the characteristics can be improved.

DETAILED DESCRIPTION

Figure 1:
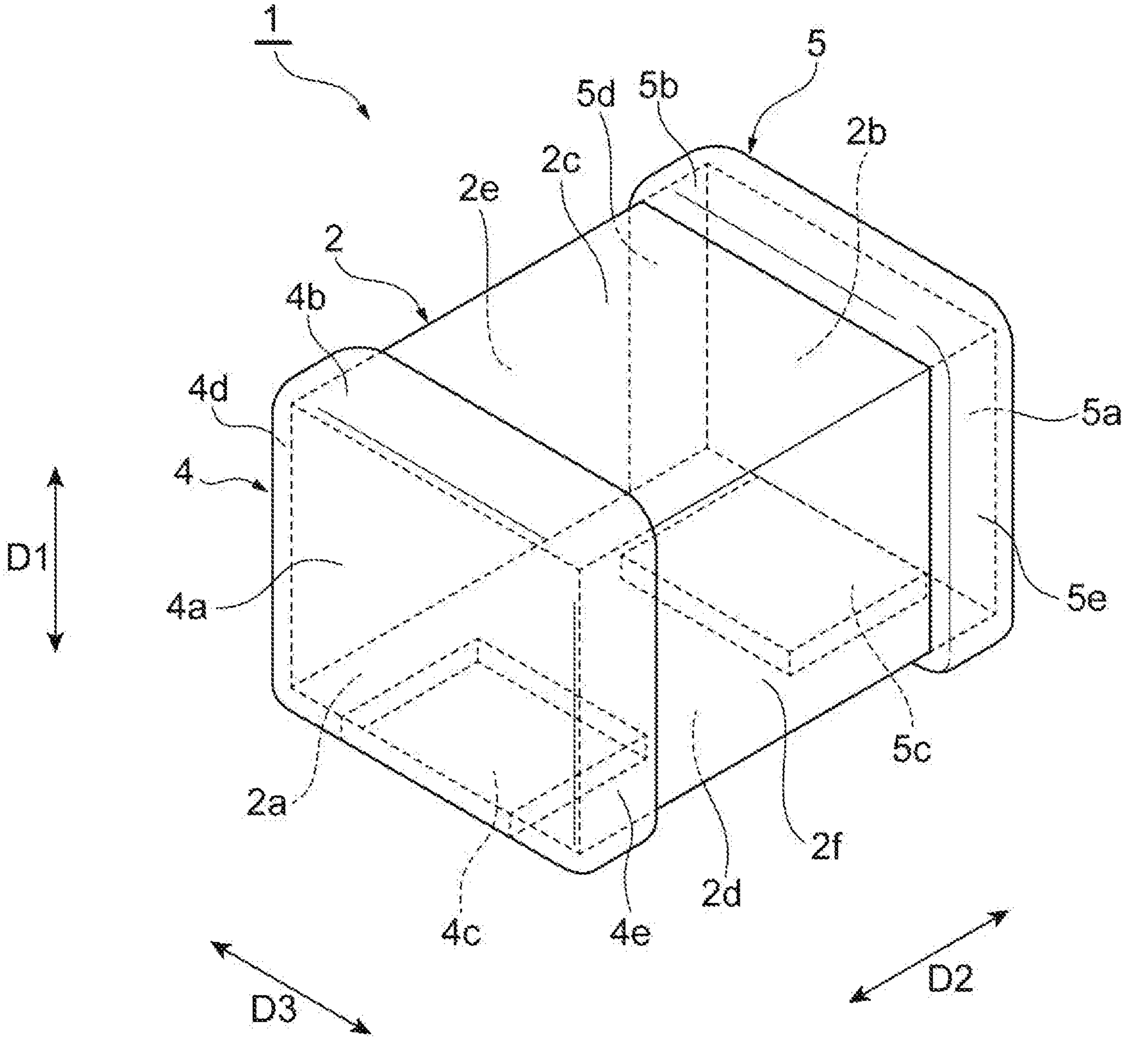
FIG. 1 is a perspective view illustrating a multilayer coil component according to an embodiment.

Hereinafter, a preferred embodiment of the present invention will be described in detail with reference to the accompanying drawings. In the description of the drawings, the same or equivalent elements will be denoted by the same reference numerals without redundant description.

As illustrated in FIG. 1, a multilayer coil component 1 is provided with an element body 2 and a first external electrode 4 and a second external electrode 5 respectively disposed in both end portions of the element body 2.

The element body 2 has a rectangular parallelepiped shape. The rectangular parallelepiped shape includes a rectangular parallelepiped shape in which a corner portion and a ridge line portion are chamfered and a rectangular parallelepiped shape in which a corner portion and a ridge line portion are rounded. The element body 2 has, as the outer surfaces of the element body 2, a pair of end surfaces 2*a* and 2*b* facing each other, a pair of main surfaces 2*c* and 2*d* facing each other, and a pair of side surfaces 2*e* and 2*f* facing each other. The facing direction in which the pair of main surfaces 2*c* and 2*d* face each other is a first direction D1. The facing direction in which the pair of end surfaces 2*a* and 2*b* face each other is a second direction D2. The facing direction in which the pair of side surfaces 2*e* and 2*f* face each other is a third direction D3. In the present embodiment, the first direction D1 is the height direction of the element body 2. The second direction D2 is the longitudinal direction of the element body 2 and is orthogonal to the first direction D1. The third direction D3 is the width direction of the element body 2 and is orthogonal to the first direction D1 and the second direction D2.

The pair of end surfaces 2*a* and 2*b* extend in the first direction D1 so as to interconnect the pair of main surfaces 2*c* and 2*d*. The pair of end surfaces 2*a* and 2*b* also extend in the third direction D3 (short side direction of the pair of main surfaces 2*c* and 2*d*). The pair of side surfaces 2*e* and 2*f* extend in the first direction D1 so as to interconnect the pair of main surfaces 2*c* and 2*d*. The pair of side surfaces 2*e* and 2*f* also extend in the second direction D2 (long side direction of the pair of end surfaces 2*a* and 2*b*). In the present embodiment, the main surface 2*d* is defined as a mounting surface facing another electronic device when the multilayer coil component 1 is mounted on the electronic device (such as a circuit board and an electronic component).

Figure 2:
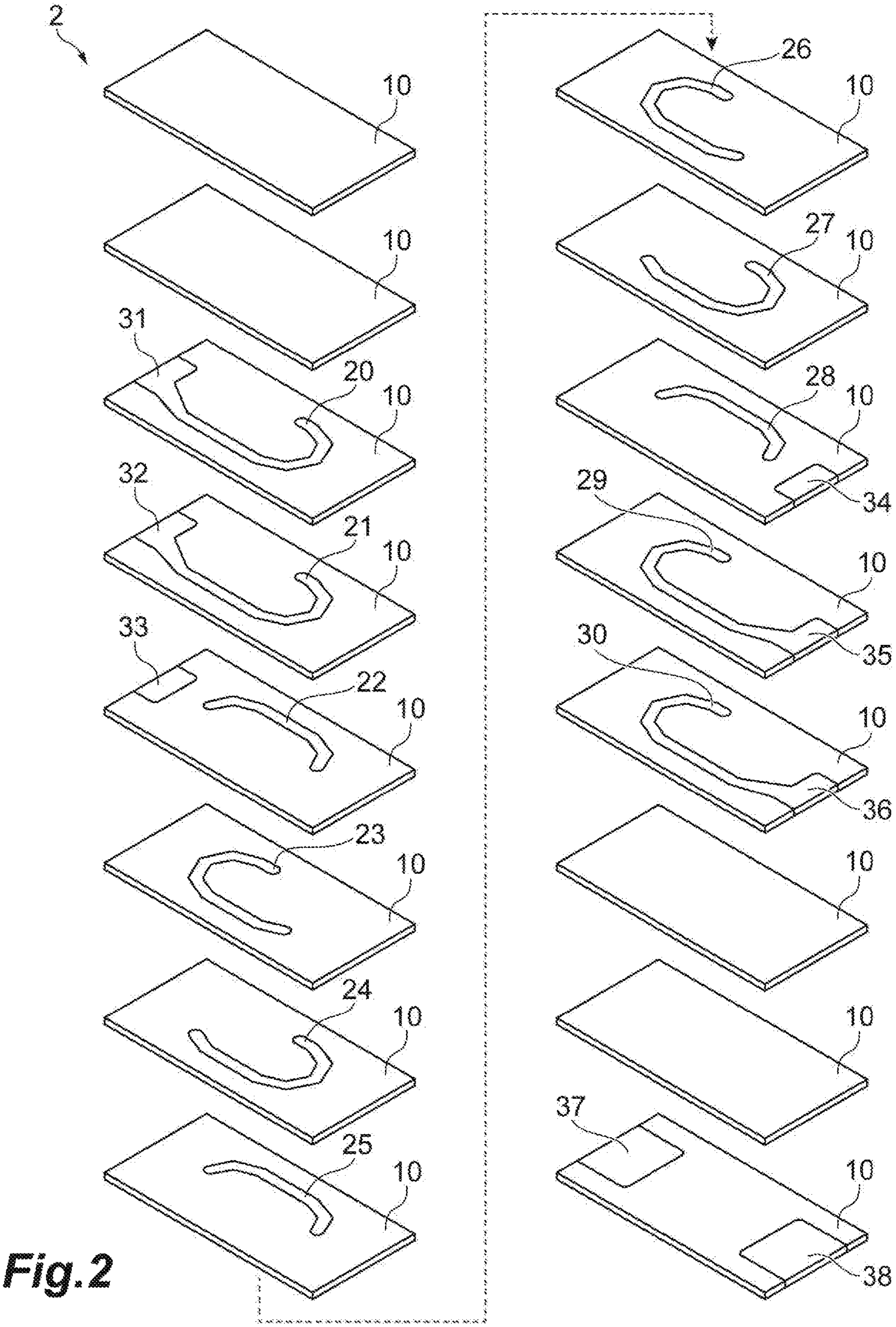
FIG. 2 is an exploded perspective view of an element body of the multilayer coil component illustrated in FIG. 1.

As illustrated in FIG. 2, the element body 2 is configured by a plurality of dielectric layers (insulator layers) 10 being stacked in the direction in which the pair of side surfaces 2*e* and 2*f* face each other. In the element body 2, the stacking direction of the plurality of dielectric layers 10 (hereinafter, simply referred to as "stacking direction") coincides with the first direction D1. Each dielectric layer 10 is formed of a dielectric material containing a glass component. Specifically, a sintered body of a ceramic green sheet containing a glass ceramic material constitutes each dielectric layer 10. The dielectric material is, for example, $BaTiO_3$-based dielectric ceramic, Ba(Ti, Zr)$O_3$-based dielectric ceramic, or (Ba, Ca)$TiO_3$-based dielectric ceramic. In the actual element body 2, the dielectric layers 10 are integrated to the extent that the boundary between the dielectric layers 10 is invisible.

As illustrated in FIG. 1, the first external electrode 4 is disposed on the end surface 2*a* side of the element body 2 and the second external electrode 5 is disposed on the end surface 2*b* side of the element body 2. In other words, the first external electrode 4 and the second external electrode 5 are spaced apart from each other in the facing direction of the pair of end surfaces 2*a* and 2*b*. The first external electrode 4 and the second external electrode 5 contain a conductive material (such as Ag and Pd). The first external electrode 4 and the second external electrode 5 are configured as sintered bodies of conductive paste containing glass frit and conductive metal powder (such as Ag powder and Pd powder). Plating layers are formed on the surfaces of the first external electrode 4 and the second external electrode 5 by electroplating being performed on the first external electrode 4 and the second external electrode 5. Ni, Sn, or the like is used for the electroplating.

The first external electrode 4 is disposed on the end surface 2*a* side. The first external electrode 4 includes five electrode parts including a first electrode part 4*a* positioned on the end surface 2*a*, a second electrode part 4*b* positioned on the main surface 2*c*, a third electrode part 4*c* positioned on the main surface 2*d*, a fourth electrode part 4*d* positioned on the side surface 2*e*, and a fifth electrode part 4*e* positioned on the side surface 2*f*. The first electrode part 4*a*, the second electrode part 4*b*, the fourth electrode part 4*d*, and the fifth electrode part 4*e* are connected in the ridge line portion of the element body 2 and are electrically connected to each other. The first external electrode 4 is formed on five surfaces including the end surface 2*a*, the pair of main surfaces 2*c* and 2*d*, and the pair of side surfaces 2*e* and 2*f*. The first electrode part 4*a*, the second electrode part 4*b*, the third electrode part 4*c*, the fourth electrode part 4*d*, and the fifth electrode part 4*e* are integrally formed. The first electrode part 4*a*, the second electrode part 4*b*, the fourth electrode part 4*d*, and the fifth electrode part 4*e* are formed by, for example, an immersion (dipping) method.

As illustrated in FIG. 2, an electrode conductor 37 constitutes the third electrode part 4*c*. The electrode conductor 37 is formed to have a predetermined width in the third direction D3. The electrode conductor 37 is made of a conductive material (such as Ni and Cu). The electrode conductor 37 is provided in the recess of the dielectric layer 10. The electrode conductor 37 is formed by the recess being formed in the dielectric layer 10, the recess being filled with conductive paste made of a conductive material, and firing being performed. The third electrode part 4*c* is longer than the second electrode part 4*b* in the second direction D2. When viewed from the first direction D1, the third electrode part 4*c* is larger in area than the second electrode part 4*b*.

As illustrated in FIG. 1, the second external electrode 5 is disposed on the end surface 2*b* side. The second external electrode 5 includes five electrode parts including a first electrode part 5*a* positioned on the end surface 2*b*, a second electrode part 5*b* positioned on the main surface 2*c*, a third electrode part 5*c* positioned on the main surface 2*d*, a fourth electrode part 5$d$ positioned on the side surface 2$e$, and a fifth electrode part 5$e$ positioned on the side surface 2$f$. The first electrode part 5$a$, the second electrode part 5$b$, the fourth electrode part 5$d$, and the fifth electrode part 5$e$ are connected in the ridge line portion of the element body 2 and are electrically connected to each other. The second external electrode 5 is formed on the five surfaces including the end surface 2$b$, the pair of main surfaces 2$c$ and 2$d$, and the pair of side surfaces 2$e$ and 2$f$. The first electrode part 5$a$, the second electrode part 5$b$, the third electrode part 5$c$, the fourth electrode part 5$d$, and the fifth electrode part 5$e$ are integrally formed. The first electrode part 5$a$, the second electrode part 5$b$, the fourth electrode part 5$d$, and the fifth electrode part 5$e$ are formed by, for example, an immersion (dipping) method.

As illustrated in FIG. 2, an electrode conductor 38 constitutes the third electrode part 5$c$. The electrode conductor 38 is formed to have a predetermined width in the third direction D3. The electrode conductor 38 is made of a conductive material (such as Ni and Cu). The electrode conductor 38 is provided in the recess of the dielectric layer 10. The electrode conductor 38 is formed by the recess being formed in the dielectric layer 10, the recess being filled with conductive paste made of a conductive material, and firing being performed. The third electrode part 5$c$ is longer than the second electrode part 5$b$ in the second direction D2. When viewed from the first direction D1, the third electrode part 4$c$ is larger in area than the second electrode part 4$b$. The distance between the second electrode part 4$b$ of the first external electrode 4 and the second electrode part 5$b$ of the second external electrode 5 is shorter than the distance between the third electrode part 4$c$ of the first external electrode 4 and the third electrode part 5$c$ of the second external electrode 5.

Figure 4:
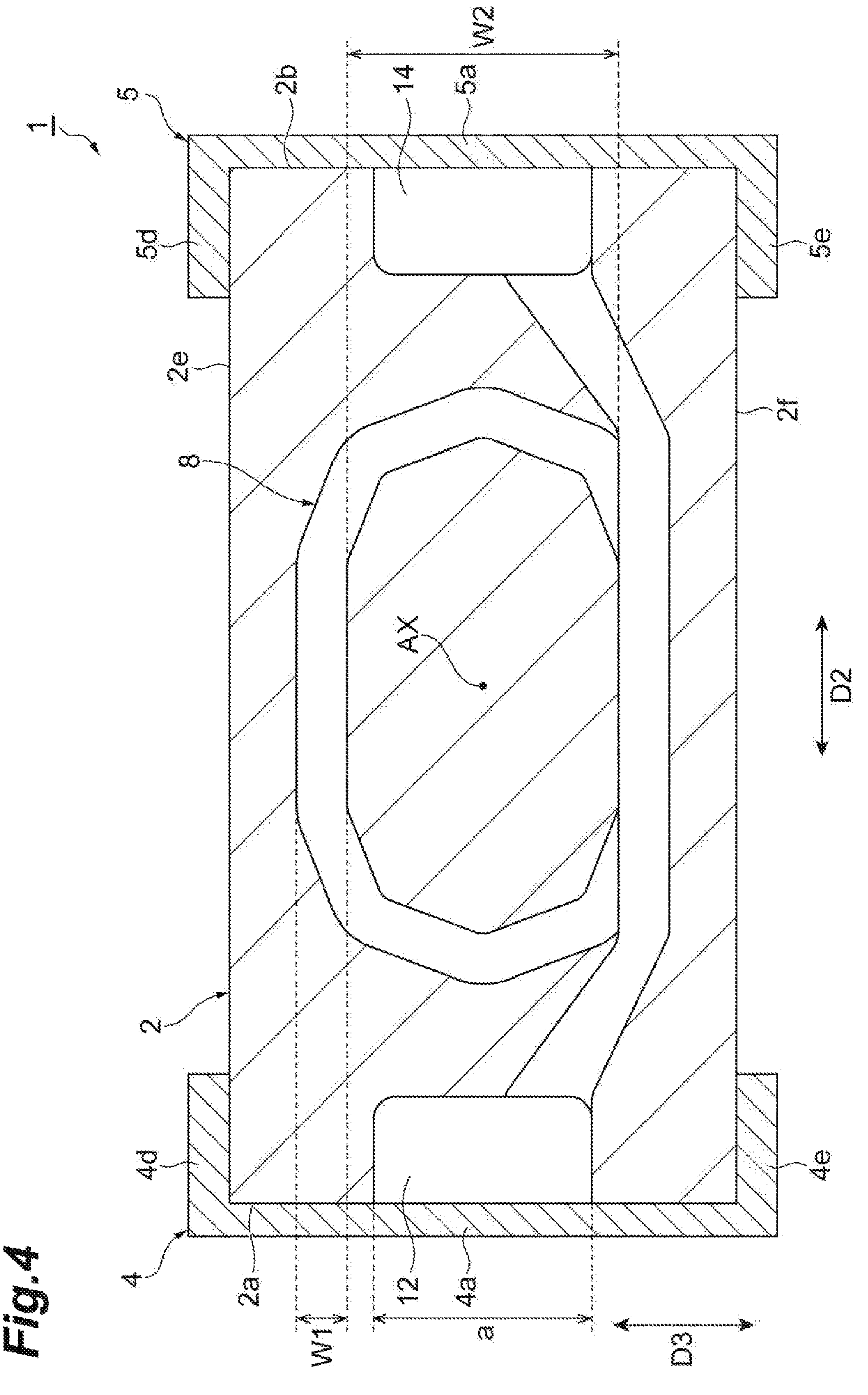
FIG. 4 is a cross-sectional view of the multilayer coil component.

In the multilayer coil component 1, a coil 8 is disposed in the element body 2. As illustrated in FIG. 4, a coil axis AX (axial direction) of the coil 8 extends along the first direction D1 (facing direction of the pair of main surfaces 2$c$ and 2$d$). In other words, the coil axis AX of the coil 8 extends in a direction orthogonal to the mounting surface of the element body 2. As illustrated in FIG. 2, the coil 8 is configured by a plurality of coil conductors being connected. Specifically, the coil 8 is configured by a first coil conductor 20, a second coil conductor 21, a third coil conductor 22, a fourth coil conductor 23, a fifth coil conductor 24, a sixth coil conductor 25, a seventh coil conductor 26, an eighth coil conductor 27, a ninth coil conductor 28, a tenth coil conductor 29, and an eleventh coil conductor 30 being electrically connected.

Each of the first coil conductor 20, the second coil conductor 21, the third coil conductor 22, the fourth coil conductor 23, the fifth coil conductor 24, the sixth coil conductor 25, the seventh coil conductor 26, the eighth coil conductor 27, the ninth coil conductor 28, the tenth coil conductor 29, and the eleventh coil conductor 30 is made of a conductive material (such as Ni and Cu) usually used as a conductor of a coil. Each of the second coil conductor 21, the third coil conductor 22, the fourth coil conductor 23, the fifth coil conductor 24, the sixth coil conductor 25, the seventh coil conductor 26, the eighth coil conductor 27, the ninth coil conductor 28, the tenth coil conductor 29, and the eleventh coil conductor 30 is configured as a sintered body of conductive paste containing the conductive material.

Each of the first coil conductor 20, the second coil conductor 21, the third coil conductor 22, the fourth coil conductor 23, the fifth coil conductor 24, the sixth coil conductor 25, the seventh coil conductor 26, the eighth coil conductor 27, the ninth coil conductor 28, the tenth coil conductor 29, and the eleventh coil conductor 30 has a predetermined width when viewed from the first direction D1. Each of the third coil conductor 22, the fourth coil conductor 23, the fifth coil conductor 24, the sixth coil conductor 25, the seventh coil conductor 26, the eighth coil conductor 27, and the ninth coil conductor 28 has substantially the same width over the entire length thereof.

In the first coil conductor 20, the part of connection to a first connection conductor 31 (described later) is formed wider than the other part and the other part is similar in width to the other conductors. In the second coil conductor 21, the part of connection to a second connection conductor 32 (described later) is formed wider than the other part and the other part is similar in width to the other conductors. In the tenth coil conductor 29, the part of connection to a second connection conductor 35 (described later) is formed wider than the other part and the other part is similar in width to the other conductors. In the eleventh coil conductor 30, the part of connection to a third connection conductor 36 is formed wider than the other part and the other part is similar in width to the other conductors.

Figure 3:
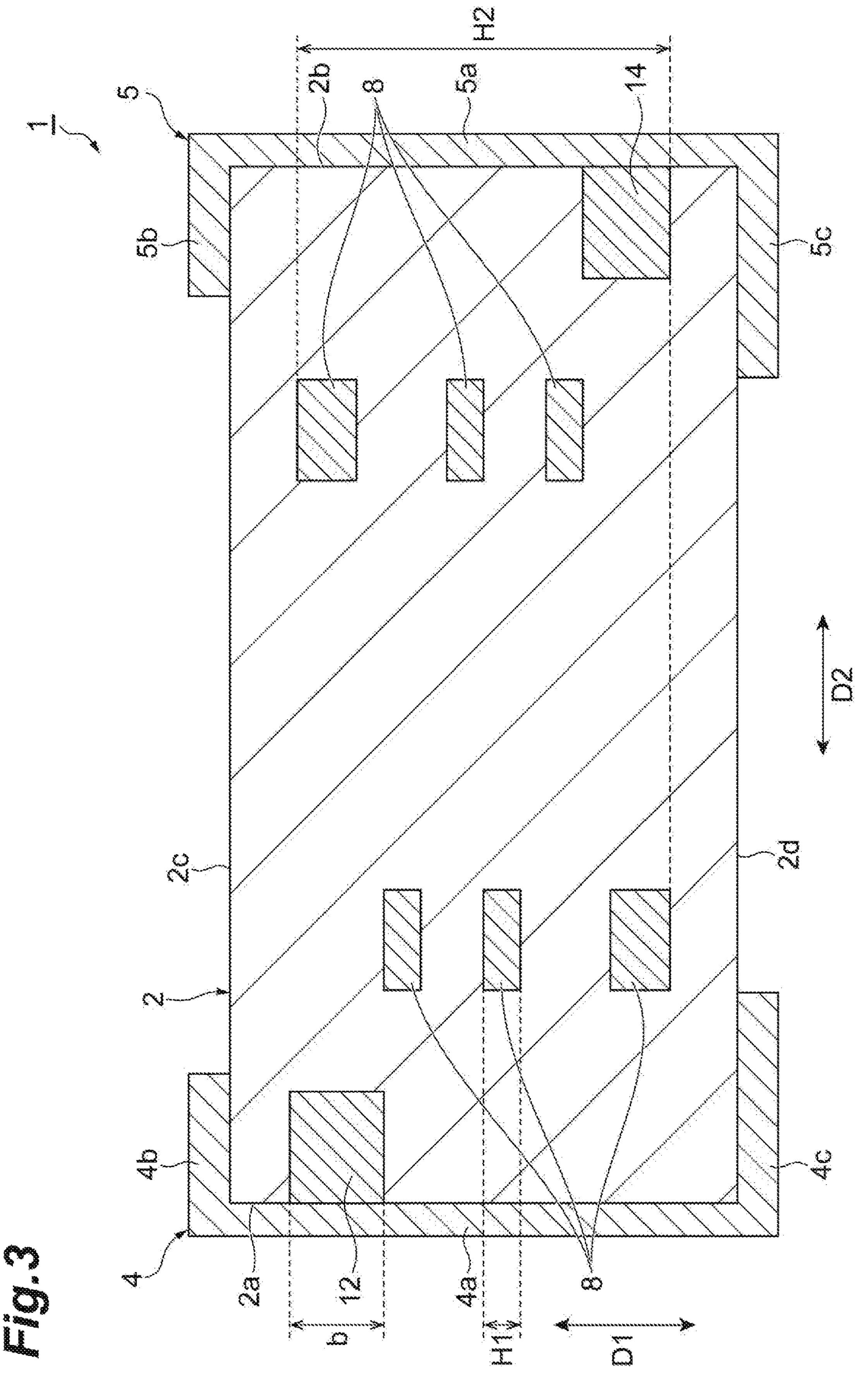
FIG. 3 is a cross-sectional view of the multilayer coil component.

As illustrated in FIGS. 3 and 4, the multilayer coil component 1 is provided with a first connection portion 12 interconnecting one end portion of the coil 8 and the first external electrode 4 and a second connection portion 14 interconnecting the other end portion of the coil 8 and the second external electrode 5.

Figure 5:
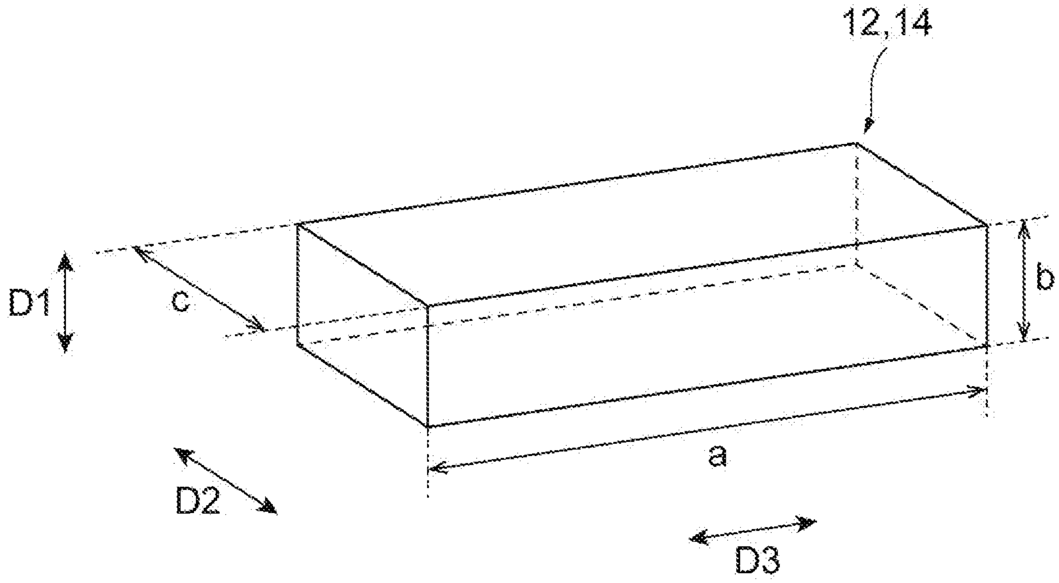
FIG. 5 is a perspective view illustrating a first connection portion and a second connection portion.

As illustrated in FIG. 5, the first connection portion 12 has a rectangular parallelepiped shape. The rectangular parallelepiped shape includes a rectangular parallelepiped shape in which a corner portion and a ridge line portion are chamfered and a rectangular parallelepiped shape in which a corner portion and a ridge line portion are rounded. Each surface of the first connection portion 12 has a rectangular shape (including a square shape).

As illustrated in FIG. 2, the first connection conductor 31, the second connection conductor 32, and a third connection conductor 33 constitute the first connection portion 12. The first connection portion 12 is configured by the first connection conductor 31, the second connection conductor 32, and the third connection conductor 33 being stacked in the first direction D1. The first connection conductor 31 is formed integrally with the first coil conductor 20. The second connection conductor 32 is formed integrally with the second coil conductor 21. The first connection conductor 31, the second connection conductor 32, and the third connection conductor 33 are made of a conductive material (such as Ni and Cu). The first connection conductor 31, the second connection conductor 32, and the third connection conductor 33 are provided in the recess of the dielectric layer 10. The first connection conductor 31, the second connection conductor 32, and the third connection conductor 33 are formed by the recess being formed in the dielectric layer 10, the recess being filled with conductive paste made of a conductive material, and firing being performed.

The distance between the main surface 2$c$ and the surface of the first connection portion 12 (first connection conductor 31) that is on the main surface 2$c$ side is equal to or greater than the distance between the main surface 2$c$ and the surface of the coil 8 (first coil conductor 20) that is on the main surface 2$c$ side. In the present embodiment, the distance between the main surface 2$c$ and the surface of the first connection portion 12 that is on the main surface 2$c$ side is equal to the distance between the main surface 2$c$ and the surface of the coil 8 that is on the main surface 2$c$ side.

As illustrated in FIG. 5, the second connection portion 14 has a rectangular parallelepiped shape. As illustrated in FIG.

2, a first connection conductor 34, the second connection conductor 35, and the third connection conductor 36 constitute the second connection portion 14. The second connection portion 14 is configured by the first connection conductor 34, the second connection conductor 35, and the third connection conductor 36 being stacked in the first direction D1. The second connection conductor 35 is formed integrally with the tenth coil conductor 29. The third connection conductor 36 is formed integrally with the eleventh coil conductor 30. The first connection conductor 34, the second connection conductor 35, and the third connection conductor 36 are made of a conductive material (such as Ni and Cu). The first connection conductor 34, the second connection conductor 35, and the third connection conductor 36 are provided in the recess of the dielectric layer 10. The first connection conductor 34, the second connection conductor 35, and the third connection conductor 36 are formed by the recess being formed in the dielectric layer 10, the recess being filled with conductive paste made of a conductive material, and firing being performed.

The distance between the main surface 2*d* and the surface of the second connection portion 14 (third connection conductor 36) that is on the main surface 2*d* side is equal to or greater than the distance between the main surface 2*d* and the surface of the coil 8 (eleventh coil conductor 30) that is on the main surface 2*d* side. In the present embodiment, the distance between the main surface 2*d* and the surface of the second connection portion 14 that is on the main surface 2*d* side is equal to the distance between the main surface 2*d* and the surface of the coil 8 that is on the main surface 2*d* side.

The first connection portion 12 and the second connection portion 14 are disposed in the region between the surface of the coil 8 on the main surface 2*c* side and the surface of the coil 8 on the main surface 2*d* side in the first direction D1. In other words, the first connection portion 12 does not protrude to the main surface 2*c* side beyond the surface of the coil 8 on the main surface 2*c* side in the first direction D1. The second connection portion 14 does not protrude to the main surface 2*d* side beyond the surface of the coil 8 on the main surface 2*d* side in the first direction D1. The region between the surface of the coil 8 on the main surface 2*c* side and the surface of the coil 8 on the main surface 2*d* side includes the region between a virtual line that is along the second direction D2 and passes through the surface of the coil 8 on the main surface 2*c* side and a virtual line that is along the second direction D2 and passes through the surface of the coil 8 on the main surface 2*d* side as well as the region of the element body 2 that is actually disposed between the surface of the coil 8 on the main surface 2*c* side and the surface of the coil 8 on the main surface 2*d* side in the first direction D1.

As illustrated in FIG. 5, in the first connection portion 12, a first dimension (width) in the third direction D3 is "a", a second dimension (height) in the first direction D1 is "b", and a third dimension (length) in the second direction D2 is "c". The first dimension a is, for example, approximately 100 μm. The second dimension b is, for example, approximately 20 μm. The third dimension c is, for example, approximately 25 μm. The first connection portion 12 satisfies the following relationship.

$$a \times c < 2(a \times b) + (b \times c)$$

"a×c" is the area of the main surface of the first connection portion 12. One main surface of the first connection portion 12 is disposed so as to face the first external electrode 4 (second electrode part 4*b*, third electrode part 4*c*). "a×b" is the area of the end surface of the first connection portion 12. The end surface is disposed so as to face the first external electrode 4 (fourth electrode part 4*d*, fifth electrode part 4*e*). "b×c" is the area of the side surface of the first connection portion 12. The side surface is a surface (contact surface) in contact with the first external electrode 4. The second connection portion 14 is similar in configuration to the first connection portion 12.

As illustrated in FIG. 4, in the multilayer coil component 1, the first dimension a of the first connection portion 12 in the third direction D3 is smaller than an inner diameter W2 of the coil 8 in the third direction D3 (a<W1) and is larger than a width W1 of each of the first coil conductor 20, the second coil conductor 21, the third coil conductor 22, the fourth coil conductor 23, the fifth coil conductor 24, the sixth coil conductor 25, the seventh coil conductor 26, the eighth coil conductor 27, the ninth coil conductor 28, the tenth coil conductor 29, and the eleventh coil conductor 30 (a>W1) when viewed from the first direction D1. The inner diameter W2 of the coil 8 is the maximum diameter in the third direction D3. The width W1 of the first coil conductor 20, the second coil conductor 21, the tenth coil conductor 29, and the eleventh coil conductor 30 is the width of the other part described above.

As illustrated in FIG. 3, in the multilayer coil component 1, the second dimension b of the first connection portion 12 in the first direction D1 is larger than a thickness H1 of each of the first coil conductor 20, the second coil conductor 21, the third coil conductor 22, the fourth coil conductor 23, the fifth coil conductor 24, the sixth coil conductor 25, the seventh coil conductor 26, the eighth coil conductor 27, the ninth coil conductor 28, the tenth coil conductor 29, and the eleventh coil conductor 30 (b>H1) and is smaller than a height H2 of the coil 8 in the first direction D1 (b<H2) when viewed from the third direction D3. The height H2 is the distance between the surface of the first coil conductor 20 of the coil 8 that is on the main surface 2*c* side and the surface of the eleventh coil conductor 30 of the coil 8 that is on the main surface 2*d* side.

In the multilayer coil component 1, the relationship between the second connection portion 14 and the coil 8 is similar to the relationship between the first connection portion 12 and the coil 8.

As described above, in the multilayer coil component 1 according to the present embodiment, the third dimension c of each of the first connection portion 12 and the second connection portion 14 in the second direction D2 is smaller than the inner diameter W2 of the coil 8 in the third direction D3 (c<W2). The second dimension b of each of the first connection portion 12 and the second connection portion 14 in the first direction D1 is smaller than the height H2 of the coil 8 in the first direction D1 (b<H2). As a result, in the multilayer coil component 1, the area of facing between the coil 8 and each of the first connection portion 12 and the second connection portion 14 can be reduced. Accordingly, in the multilayer coil component 1, the stray capacitance that is generated between the coil 8 and the first and second connection portions 12 and 14 can be reduced. Accordingly, in the multilayer coil component 1, the occurrence of inconvenience attributable to stray capacitance can be suppressed and characteristics can be improved.

In the multilayer coil component 1 according to the present embodiment, the first connection portion 12 and the second connection portion 14 are disposed in the region between the surface of the coil 8 on the main surface 2*c* side and the surface of the coil 8 on the main surface 2*d* side in the first direction D1. In this configuration, the distance between the first connection portion 12 and the second electrode part 4*b* of the first external electrode 4 and the distance between the second connection portion 14 and the third electrode part 5*c* of the second external electrode 5 can be increased. Accordingly, in the multilayer coil component 1, the stray capacitance that is generated between the first connection portion 12 and the second electrode part 4*b* of the first external electrode 4 disposed so as to face each other and the stray capacitance that is generated between the second connection portion 14 and the third electrode part 5*c* of the second external electrode 5 disposed so as to face each other can be reduced. As a result, the characteristics can be further improved in the multilayer coil component 1.

In the multilayer coil component 1, the first dimension a of each of the first connection portion 12 and the second connection portion 14 in the third direction D3 is larger than the width W1 of each of the first coil conductor 20, the second coil conductor 21, the third coil conductor 22, the fourth coil conductor 23, the fifth coil conductor 24, the sixth coil conductor 25, the seventh coil conductor 26, the eighth coil conductor 27, the ninth coil conductor 28, the tenth coil conductor 29, and the eleventh coil conductor 30 (a>W1). The second dimension b of each of the first connection portion 12 and the second connection portion 14 in the first direction D1 is larger than the thickness H1 of each of the first coil conductor 20, the second coil conductor 21, the third coil conductor 22, the fourth coil conductor 23, the fifth coil conductor 24, the sixth coil conductor 25, the seventh coil conductor 26, the eighth coil conductor 27, the ninth coil conductor 28, the tenth coil conductor 29, and the eleventh coil conductor 30 in the first direction D1 (b>H1). As a result, in the multilayer coil component 1, the coil 8 and each of the first connection portion 12 and the second connection portion 14 are reliably connected to each other, and thus connectivity can be ensured between the coil 8 and each of the first external electrode 4 and the second external electrode 5. Accordingly, the characteristics can be improved in the multilayer coil component 1.

In the multilayer coil component 1 according to the present embodiment, the following relationship is satisfied in a case where the first dimension in the third direction D3 is "a", the second dimension in the first direction D1 is "b", and the third dimension in the second direction D2 is "c" in each of the first connection portion 12 and the second connection portion 14.

$$a\times c<2(a\times b)+(b\times c)$$

In the multilayer coil component 1, the area of the third electrode part 5*c* of the second external electrode 5 is larger than the area of the second electrode part 5*b*. The main surface of the second connection portion 14 is disposed so as to face the third electrode part 5*c* of the second external electrode 5 (electrode part disposed on the mounting surface). Accordingly, the stray capacitance that is formed between the second connection portion 14 and the second external electrode 5 can be increased. In the second connection portion 14, the area of the main surface facing the third electrode part 5*c* of the second external electrode 5 is smaller than the area of the pair of end surfaces and the side surface. As a result, in the multilayer coil component 1, the stray capacitance that is formed between the second connection portion 14 and the second external electrode 5 can be reduced. Accordingly, in the multilayer coil component 1, the occurrence of inconvenience attributable to stray capacitance can be suppressed and the characteristics can be improved.

Although an embodiment of the present invention has been described above, the present invention is not necessarily limited to the embodiment described above and various modifications can be made within the scope of the present invention.

Described as an example in the embodiment is a form in which the third electrode part 4*c* is formed from the electrode conductor 37 in the first external electrode 4 and the third electrode part 4*c* is longer than the second electrode part 4*b* in the second direction D2 (the third electrode part 4*c* is larger in area than the second electrode part 4*b*). However, the configuration of the first external electrode 4 is not limited thereto. The same applies to the second external electrode 5.

Described as an example in the embodiment is a form in which the first coil conductor 20, the second coil conductor 21, the third coil conductor 22, the fourth coil conductor 23, the fifth coil conductor 24, the sixth coil conductor 25, the seventh coil conductor 26, the eighth coil conductor 27, the ninth coil conductor 28, the tenth coil conductor 29, and the eleventh coil conductor 30 constitute the coil 8. However, the number of conductors constituting the coil (number of turns of the coil) is not limited thereto. The number of conductors may be appropriately set in accordance with the design (desired characteristics) of the multilayer coil component 1.

What is claimed is:

1. A multilayer coil component comprising:

an element body composed of a plurality of stacked dielectric layers and having a pair of end surfaces facing each other, a pair of main surfaces facing each other, and a pair of side surfaces facing each other, the element body having a stacking direction in a facing direction of the main surfaces;

a coil configured by a plurality of interconnected coil conductors disposed in the element body, and having a coil axis extending along a facing direction of the pair of main surfaces, the plurality of coil conductors being composed of one or more layers in the stacking direction;

a first external electrode disposed on one of the end surfaces, the pair of main surfaces, and the pair of side surfaces of the element body;

a second external electrode disposed on the other end surface, the pair of main surfaces, and the pair of side surfaces of the element body;

a first connection portion comprising a plurality of first layers, the first connection portion interconnecting one end portion of the coil and the first external electrode, the first connection portion being directly connected with a first coil conductor of the plurality of coil conductors, and composed of more layers in the stacking direction than the first coil conductor, wherein the first layers of the first connection portion are directly connected via overlapping parts when viewed in the stacking direction; and a second connection portion comprising a plurality of second layers, the second connection portion interconnecting the other end portion of the coil and the second external electrode, the second connection portion being directly connected with a second coil conductor of the plurality of coil conductors, and composed of more layers in the stacking direction than the second coil conductor, wherein the second layers of the second connection portion are directly connected via overlapping parts when viewed in the stacking direction, wherein a first dimension of each of the first connection portion and the second connection portion in a facing direction of the pair of side surfaces is smaller than an inner diameter of the coil in the facing direction of the pair of side surfaces and is larger than a width of each of the plurality of interconnected coil conductors in the facing direction of the pair of side surfaces, where b is a second dimension of each of the first connection portion and the second connection portion in the stacking direction, H1 a thickness of each of the plurality of interconnected coil conductors in the stacking direction, and H2 is a height of the coil in the stacking direction, $b<H2$ and $b>H1$, wherein two of the plurality of first layers of the first connection portion each comprises a connection conductor and a coil conductor that are directly connected, and one of the plurality of first layers of the first connection portion comprises a connection conductor and a coil conductor that are not directly connected, and two of the plurality of second layers of the second connection portion each comprises a connection conductor and a coil conductor that are directly connected, and one of the plurality of second layers of the second connection portion comprises a connection conductor and a coil conductor that are not directly connected.

2. The multilayer coil component according to claim 1, wherein each of the first connection portion and the second connection portion has a rectangular parallelepiped shape.

3. The multilayer coil component according to claim 1, wherein the first connection portion and the second connection portion are disposed in a region between a surface of the coil on a side of one of the main surfaces and a surface of the coil on a side of the other main surface in the facing direction of the pair of main surfaces.

* * * * *